United States Patent [19]
Lukkari et al.

[11] Patent Number: 5,314,295
[45] Date of Patent: May 24, 1994

[54] ROLL STOP AND OPERATING METHOD OF THE SAME

[75] Inventors: Jorma Lukkari, Järvenpää; Matti Kärnä, Hyvinkää both of Finland

[73] Assignee: Valmet Paper Machinery, Inc., Helsinki, Finland

[21] Appl. No.: 14,782

[22] Filed: Feb. 8, 1993

[30] Foreign Application Priority Data

Feb. 7, 1992 [FI] Finland ................... 920517

[51] Int. Cl.$^5$ .............................................. B66F 11/00
[52] U.S. Cl. .................................. 414/746.4; 414/911
[58] Field of Search .............. 474/746.4, 911, 786; 198/633; 193/35 A, 40, 32

[56] References Cited

U.S. PATENT DOCUMENTS

| | | | |
|---|---|---|---|
| 4,435,119 | 3/1984 | House | 414/911 X |
| 5,096,135 | 3/1992 | Eichenberger et al. | 414/911 X |

FOREIGN PATENT DOCUMENTS

| | | | |
|---|---|---|---|
| 0115505 | 9/1980 | Japan | 193/40 |
| 0118606 | 7/1984 | Japan | 193/40 |

Primary Examiner—D. Glenn Dayoan
Assistant Examiner—Cheryl L. Gastineau
Attorney, Agent, or Firm—Cohen, Pontani, Lieberman & Pavane

[57] ABSTRACT

A pneumatically operated roll stop of controllable speed is provided for stopping a roll. A first end of a stop arm is operatively connected to a pivotal joint of a frame. The distal end of the stop arm is provided for making contact with the roll to be stopped. A pneumatic cylinder comprises a cylinder unit having first and second ends defining a cavity therein. A piston is axially aligned in the cylinder and separates first and second working chambers. A piston rod is operatively connected to the piston axially extending outward from the cavity at a first end of the cylinder unit. The rod is operatively engaged with the frame, and the second end of the cylinder is operatively engaged to the stop arm. A first passage is provided for pneumatically connecting the first working chamber to a control valve and a pulse valve, and a second passage is provided for pneumatically connecting the second working chamber to the control valve. A control opens and closes the control valve and modulates the opening and closing of the pulse valve for pneumatically controlling the first and second working chambers for regulating the movement of the stop arm to stop the roll.

9 Claims, 1 Drawing Sheet

ROLL STOP AND OPERATING METHOD OF THE SAME

FIELD OF THE INVENTION

The present invention relates to a pneumatically operated roll stop according of controllable speed particularly suited for paper rolls.

The invention also concerns a method according to the preamble of claim 6 for operating said roll stop to stop paper rolls.

BACKGROUND OF THE INVENTION

Paper mills utilize large conveyor systems for transferring rolls, e.g., from the slitter to the packaging line, and further to the storage area. The transport system comprises, e.g., lamellar conveyors, car conveyors, ramps and a variety of equipment suited to the transfer of the rolls from one conveyor to the next and to packaging lines. Such transport equipment incorporates different types of pushers and stops employed for pushing the roll into rolling motion and then stopping the same in a controlled manner at a desired location. The most common type of a roll stop is an arm pivotally mounted at its one end and adapted for motion control by means of a pneumatic cylinder. Such a roll stop operates so that along with its rolling motion, the roll hits a contact roll mounted to the distal end of the stop arm and begins to swing the arm toward the direction of the roll motion. Simultaneously, the arm actuates a pneumatic cylinder equipped with an outlet throttle valve at that side of the cylinder actuated during the braking of the roll motion. The throttling action slows down the cylinder stroke rate, as well as thereby also the roll motion, whereby the roll motion is brought to a halt. The cylinder is returned to its home position by applying compressed air pressure to the other side of the cylinder. Such return stroke can also be utilized for pushing the roll into a new motion, e.g., away from a wrapping station.

Conventional roll stops are operated at an almost constant rate of speed deceleration throughout the entire roll stopping distance. Currently, the size difference between the minimum size and maximum size paper rolls produced in paper mills is very large; in modern mills ranges typically are as wide as 200 ... 8000 kg. A pneumatic stop performs satisfactorily only over a restricted range of roll sizes. When several different roll speeds have to be managed, a separate valve with an individual throttling characteristic has been required for each preset stopping speed. During operation, the roll size is identified, after which a suitable valve/throttling combination is selected for use by an automation system. Obviously, the number of the valves is limited in order to avoid an excessively complicated and expensive construction of the equipment. Typically, three different valve/throttling combinations have been employed, whereby three speed ranges are selectable.

The operating principle of a constant rate-of-speed deceleration over the entire stopping distance, as employed in prior-art roll stops, has several disadvantages. The paper roll hits the contact roll of the stop arm extremely violently at the instant of first encounter, and the outer layers of the roll may become damaged and therefore unusable. These unusable portions become scrap and are discarded. The instant the roll hits the roll stop, the stop imposes a high impact energy on the roll that causes deformations and possibly even web tear. Moreover, such a conventional roll stop is slow in operation, because it operates with a constant rate of speed deceleration over the entire stopping distance. During the transfer of the rolls, the speed of the rolls must be kept low, since the braking power of the roll stops must be designed sufficiently weak to avoid damage to the roll. On the other hand, this results in a long transfer time of the rolls and reduces the speed of the transfer lines substantially. Furthermore, a great number of intermediate stops and roll retarders are necessary to control the speed of the rolling paper rolls.

OBJECT OF THE INVENTION

It is an object of the present invention to achieve a pneumatically operated roll stop offering a controllable rate of stopping deceleration which is related to the required roll braking power as a function of, e.g., the roll weight.

SUMMARY OF THE INVENTION

The invention is based on providing the outlet line of a pneumatic cylinder at that side of the cylinder actuated during the braking of the roll motion with a pulse-controlled valve suitable for controlling the air outlet flow rate from the cylinder chamber.

According to an aspect of the present invention, a pneumatically operated roll stop of controllable speed is provided for stopping a roll. A first end of a stop arm is operatively connected to a pivotal joint of a frame. The distal end of the stop arm is provided for making contact with the roll to be stopped. A pneumatic cylinder comprises a cylinder unit having first and second ends defining a cavity therein. A piston is axially aligned in the cylinder and separates first and second working chambers. A piston rod is operatively connected to the piston axially extending outward from the cavity at a first end of the cylinder unit. The rod is operatively engaged with the frame, and the second end of the cylinder is operatively engaged to the stop arm. A first passage is provided for pneumatically connecting the first working cylinder to a control valve and a pulse valve and a second passage is provided for pneumatically connecting the second working chamber to the control valve. A control means opens and closes a control valve and modulates the opening and closing of the pulse valve for pneumatically controlling the first and second working chambers so as to stop the roll.

According to another aspect of the present invention, a method is provided for stopping a roll with a roll stop comprising a stop arm operatively connected to a frame whose movements are controlled by a pneumatic cylinder having a throttle valve and a pulse valve. The method comprises the step of determining a breaking force required to stop the roll in accordance with the weight of the roll. The approach of the roll is sensed and is then received by the stop arm. The throttle valve is controlled to an open position to permit the outlet air flow from the pneumatic cylinder. The pulse valve is modulated between the open and closed position to permit the outlet of air flow from the pneumatic cylinder. The controlling of the throttle valve and the modulating of the pulse valve is performed in accordance with the determined breaking force, so as to regulate the stop arm to stop the roll.

The invention offers significant benefits.

The apparatus according the present invention offers an easy control method of the braking force during the reception of the roll at the roll stop. The braking force of the receiving roll stop can be set separately by roll, thus permitting an individually optimal control of the braking force for each roll. The rate of stopping speed at the receiving stop can be adjusted even during the braking motion, thus offering the benefit of low braking power at the instant of first encounter so reducing roll damages substantially. Correspondingly, the braking power can be increased at the end of the stopping motion. This higher braking power imposed on the roll can be utilized to reduce the need for intermediate retarders and increase the roll transfer speed. The stopping motion itself will be quicker by virtue of the shorter total time required for stopping the roll. For such reasons, the capacity of roll handling lines can be increased and the throughput times of the rolls shortened. The apparatus will be simplified over the construction of multiple-valve stops and permit improved control of the stopping operation. The stopping system according to the invention can be easily retrofitted in conventional pneumatically operated roll stops during plant revamping.

DETAILED DESCRIPTION OF THE DRAWINGS

Figure 1:
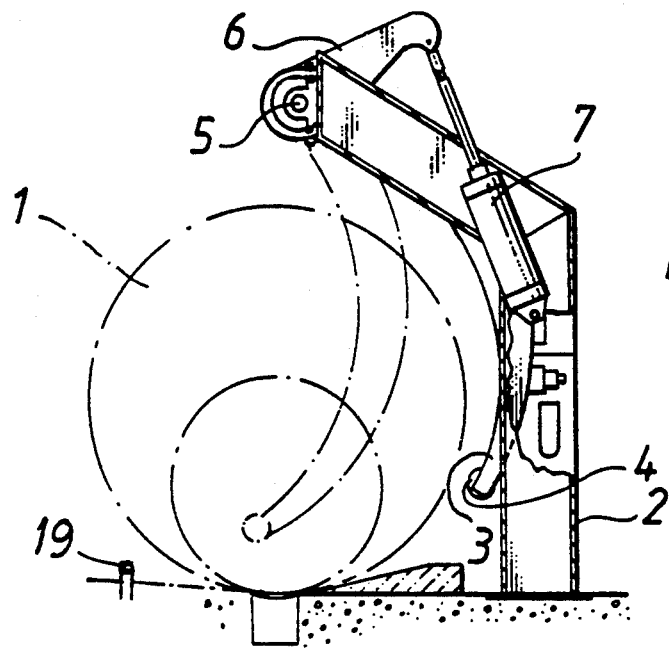

The invention is next examined in greater detail with the help of the attached drawing, in which FIG. 1 shows the side view of a pneumatically operated roll stop.

Figure 2:
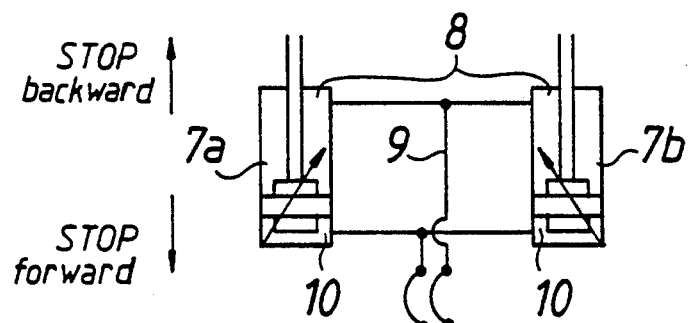

FIG. 2 shows the block diagram of one embodiment of a pneumatic circuit suited to implement the apparatus according to the invention.

DETAILED DESCRIPTION OF THE PRESENTLY PREFERRED EMBODIMENT

FIG. 1 shows a roll stop adapted above the floor level of a plant. In fact, the construction of the roll stop is not essential to the spirit of the invention, so the roll stop illustrated in FIG. 1 is here described only as an exemplifying embodiment. Such a roll stop comprises a rigid frame 2, whose upper part is inclined so as to approximately coincide with the center line of the stopped roll. Mounted to the outer edge of the frame 2 is a bearing 5, which provides a pivotal joint of a stop arm 3 with the frame 2. The curved stop arm 3 extends downward from the pivotal joint carrying a contact roll 4 at the lower end of the arm. The stop arm 3 extends over the pivot point as a lever arm 6 with the piston rod of a pneumatic cylinder 7 attached to its distal end. This type of roll stop is conventionally equipped with two parallel stop arms 3 and two pneumatic cylinders 7. Then, the contact roll 4 has the shape of an elongated cylinder and is rotatingly mounted in bearings adapted to the distal ends of the stop arms 3. The roll stop illustrated in FIG. 1 is placed in conjunction with a conveyor. The maximum and minimum sizes of the rolls 1 to be managed are shown in dashed lines. Also the receiving position of the roll stop is drawn in dashed line.

FIG. 2 shows a pneumatic circuit with two double-acting pneumatic cylinders 7a, 7b suited to implement a roll stop according to the present invention. In such a circuit, the work chambers 8, 10 of the cylinders 7a, 7b are connected by air lines 9 and 11 to ports L2 and L4 of 5/3-way solenoid-driven air valve 12. Both outlet air lines L3, L5 from the cylinder work chambers 8, 10, which are correspondingly connected to the outlet controlling ports of the 5/3-way air valve 12, are provided with a throttle 15. Compressed air required for the operation of the cylinders 7a, 7b is routed to port L1 of the air valve 12 from a compressed-air line 18 via a check valve 17 and a water separator 16.

The stopping of the roll 1 in the above-described system takes places as follows. The roll 1 with a weight identified from, e.g., the automation system of the packaging line, arrives to the roll stop either by rolling down an inclined plane or possessing rotational inertial energy imparted by a pusher. The approach of the roll 1 at the roll stop is sensed by a proximity limit detector 19, after which the roll 1 hits the contact roll 4 of the roll stop. At the hitting instant, the stop arm 3 is already actuated to a movement in the rolling direction of the roll 1. Pressure in the work chambers 8, later called the retarder chambers, on that side of the pistons of the cylinders 7a and 7b toward which the roll movement forces the pistons is slightly elevated by movement of the stop arm 3 and, because the drive voltage to the solenoid a of the 5/3-way air valve 12 and the 2/2-way pulsing valve 13 is switched on by a signal from the proximity limit detector, the port L3 connected from the 5/3-way air valve 12 to the retarder chambers 8 is driven open toward the throttle 15 and the pulsing valve 13 is also driven open. The stop arm 3, which was waiting for a roll 1 in its forward position, is retracted before the approaching roll 1 imposing a minimum braking force as the outlet air exiting the retarder chambers 8 can freely flow via the pulsing valve 13. After the lapse of the initial phase of the stop arm acceleration, the fully open control of the pulsing valve 13 is changed pulsed at a rate of approx. 10 Hz, thus causing a reduction in the speed of the stop arm 3 and the pistons of the cylinders 7a, 7b. During this phase the speed is controlled by air outflow rate limited by the fixed throttle 15 and the pulsing valve 13.

After a certain period of pulsed operation, the pulsed control signal to the pulsing valve 13 is switched off, causing the valve to cut off, and the roll 1 is brought with the minimum speed to, e.g., a lamellar conveyor. During this phase, the braking power is controlled by the fixed throttle 15 alone. To receive the next roll, the stop arm 3 is driven to its forward position by the control voltage activating the solenoid b of the 5/3-way air valve 12, whereby air is admitted from the compressed-air line 18 to the retarder chambers 8 of the cylinders 7a, 7b so returning the pistons to their home positions.

The above-described system is suited to the control of the stroke speed of an air cylinder for applications requiring several different stroke speeds. Speed control in pneumatic systems is characteristically implemented by throttling the outlet air flow from the cylinder. In the present system the cylinder 7 is controlled by a 5/3-type solenoid-driven air valve 12 equipped with outlet port throttles 15. The air line 9 from the air cylinder retarder chamber 8 is connected to the valve port L2, and the 2/2-way solenoid valve 13 is placed between the port L3 and the throttle 15. When the cylinder 7 makes a positive (+) stroke (piston rod moving outward), solenoid a of the air valve 12 is activated by the control voltage, whereby the outlet air from the retarder chamber 8 can escape via the port L3. The outlet throttle 15 connected to the port 13 is adjusted to give the positive (+) stroke a proper minimum speed for the piston of the cylinder 7. When more speed is desired for the positive (+) stroke, also the pulsing valve 13 is driven open by the control voltage. The 2/2-way pulsing valve 13 is controlled in pulsed manner by alternatingly driving the valve open and closed by the control voltage. Desired stroke speed of the cylinder piston is attained through modulation of the valve pulsing rate. During the return stroke, that is, the negative (−) stroke, the pulsing valve 13 is not activated by the control voltage, so the valve stays closed. In the case the negative (−) stroke also requires speed control, a pulsing valve is also connected in the line between L5 and the exit flow throttle in a similar manner.

In certain applications the pulsing valve 13 is controlled constantly open in the beginning of the piston movement. Next, the operation is controlled by pulsing the valve. At the end of the movement the pulsing valve 13 receives no control voltage. This arrangement provides different piston speeds for the different phases of the stroke.

The above-described system facilitates an extremely flexible speed control. The variables that can be controlled to meet the different roll sizes are typically the open-state duty cycle, pulsing rate and duration of pulsed control for the pulsing valve. Proper modulation of these variables achieves stopping of rolls of any size in a controlled manner without damage to the rolls. Selection of suitable control schemes for each roll size permits extremely smooth stopping of rolls with different sizes by means of a relatively simple stopping system. Moreover, such a system operates faster than a roll stop controlled with a preset throttle. As the outlet air flow from the cylinder can be easily controlled by the pulsing valve, the preset throttle can be adjusted for a high flow resistance, whereby the final phase of the stopping motion can achieve very efficient deceleration.

Besides that described above, the present invention can have alternative embodiments. For example, the number of cylinders and types of valves incorporated in the system can be varied to achieve an optimal arrangement for a specific application. The only essential requirement in the system is the pulse-controlled valve which is adapted between the outlet flow port of the retarder chamber of the cylinder and the discharge point of the outlet air. The pulsing valve can be placed, e.g., between the cylinder control valve and the cylinder. The preset throttle can be omitted if desired, whereby the speed control of the braking movement is implemented by controlling the pulsing variables alone. When the system is provided with a fixed throttle, the pulsing valve must be placed in the air line between the throttling point and the cylinder. In addition to stopping rolls, the present apparatus is also applicable to the deceleration of rolling rolls in an arrangement permitting sway-away of the stop arm, sorting of rolls and other roll handling applications requiring a movement of controllable speed.

We claim:

1. A pneumatically operated roll stop of controllable speed for stopping a roll, said roll stop comprising:
    a frame having a pivotal joint;
    a stop arm having a first end and a distal end, said first end being operatively connected to said pivotal joint, said distal end provided for making contact with said roll to be stopped;
    a pneumatic cylinder comprising a cylinder unit having first and second end defining a cavity therein and a piston axially aligned in said cylinder separating first and second working chambers and a piston rod operatively connected to said piston axially extending outward from said cavity at said first end of said cylinder unit, wherein one of said rod and said second end is operatively engaged with said frame and the other of said rod and said second end is operatively engaged to said stop arm;
    a control valve;
    first passage means for pneumatically connecting said first working chamber to said control valve;
    second passage means for pneumatically connecting said second working chamber to said control valve;
    a pulsed valve pneumatically connected to said first passage means; and
    control means for opening and closing said control valve and for modulating the opening and closing of said pulsed valve for pneumatically controlling said first and second working chambers for regulating the movement of said stop arm to stop the roll.

2. A roll stop according to claim 1 further comprising a throttle pneumatically connected to said first passage means for discharging air from said first working chamber, wherein said pulse valve is pneumatically connected to said first passage means after said control valve and before said throttle.

3. A roll stop according to claim 1, wherein said pulse valve is pneumatically connected to said first passage means before said control valve.

4. A roll stop according to claim 1, wherein said pulse valve is pneumatically connected to said first and second passage means.

5. A roll stop according to claim 1, wherein said pulse valve comprises a 2/2-way solenoid valve.

6. A method for stopping a roll with a roll stop comprising a stop arm operatively connected to a frame whose movements are controlled by a pneumatic cylinder having a throttle valve and a pulse valve, the method comprising the steps of:
    (a) sensing the approach to the roll stop of the roll;
    (b) receiving the roll by the stop arm;
    (c) controlling the throttle valve to an open position to permit the outlet air flow from the pneumatic cylinder; and
    (d) modulating the opening and closing of the pulse valve to permit the outlet of air flow from the pneumatic cylinder.

7. A method according to claim 6 further comprising the steps of:
    (a-1) after step (a) opening the throttle valve and the pulse valve to permit the outlet air flow from the pneumatic cylinder; and
    (d-1) (e-1) after step (d) (e) closing the pulse valve and opening the throttle valve to permit the outlet air flow from the pneumatic cylinder.

8. A method according to claim 7, wherein step (a-1) is performed for a first predetermined time period after the stop arm comes in contact with the roll.

9. A method according to claim 8, wherein step (d) is performed after said first predetermined time period for a second predetermined time period and step (d-1) is performed after said second predetermined time period for a third predetermined time period, wherein the first, second, and third predetermined time periods are set in accordance with the specific roll being stopped.

* * * * *